(12) United States Patent
Dennis (10) Patent No.: US 7,891,705 B2
(45) Date of Patent: Feb. 22, 2011

(54) TENSION CUSHION AIR BAG MODULE

(75) Inventor: Nathaniel J. Dennis, Grand Blanc, MI (US)

(73) Assignee: TK Holdings Inc., Auburn Hills, MI (US)

( * ) Notice: Subject to any disclaimer, the term of this patent is extended or adjusted under 35 U.S.C. 154(b) by 209 days.

(21) Appl. No.: 11/979,470

(22) Filed: Nov. 2, 2007

(65) Prior Publication Data

US 2008/0129022 A1 Jun. 5, 2008

Related U.S. Application Data

(60) Provisional application No. 60/856,790, filed on Nov. 6, 2006.

(51) Int. Cl.
*B60R 21/233* (2006.01)
*B60R 21/231* (2006.01)
*B60R 21/23* (2006.01)

(52) U.S. Cl. ................................ 280/743.1; 280/729

(58) Field of Classification Search .............. 280/743.1, 280/729, 731
See application file for complete search history.

(56) References Cited

U.S. PATENT DOCUMENTS

| | | | | | |
|---|---|---|---|---|---|
| 4,711,466 | A | * | 12/1987 | Breed | 280/741 |
| 4,977,016 | A | * | 12/1990 | Thornton et al. | 428/36.1 |
| 6,042,147 | A | * | 3/2000 | Nishijima et al. | 280/743.1 |
| 6,431,599 | B1 | * | 8/2002 | Bohn | 280/743.1 |
| 6,540,254 | B2 | * | 4/2003 | Bieber et al. | 280/732 |
| 6,550,804 | B2 | * | 4/2003 | Burdock | 280/731 |
| 6,554,317 | B2 | * | 4/2003 | Lorenz et al. | 280/743.1 |
| 6,595,549 | B2 | * | 7/2003 | Bohn et al. | 280/743.1 |
| 6,655,714 | B2 | * | 12/2003 | Fellhauer et al. | 280/743.1 |
| 6,726,245 | B2 | * | 4/2004 | Fellhauer et al. | 280/743.2 |
| 6,739,620 | B2 | * | 5/2004 | Derrick | 280/731 |
| 6,802,534 | B2 | * | 10/2004 | Neupert | 280/743.1 |
| 6,857,659 | B2 | * | 2/2005 | Webber | 280/743.2 |
| 7,100,943 | B2 | * | 9/2006 | Koch et al. | 280/743.2 |
| 2002/0105171 | A1 | * | 8/2002 | Fellhauer et al. | 280/728.2 |
| 2002/0195809 | A1 | * | 12/2002 | Bieber et al. | 280/743.1 |
| 2003/0042717 | A1 | * | 3/2003 | Hauer | 280/731 |
| 2003/0062712 | A1 | * | 4/2003 | Yamamoto et al. | 280/731 |
| 2003/0067148 | A1 | * | 4/2003 | Keutz | 280/731 |
| 2003/0141702 | A1 | * | 7/2003 | Keutz | 280/728.1 |
| 2003/0151235 | A1 | * | 8/2003 | Hohne et al. | 280/731 |
| 2004/0245751 | A1 | * | 12/2004 | Marotzke et al. | 280/731 |
| 2005/0104351 | A1 | * | 5/2005 | Lorenz | 280/743.1 |
| 2005/0184486 | A1 | * | 8/2005 | Schneider et al. | 280/728.2 |
| 2006/0175819 | A1 | * | 8/2006 | Abe | 280/743.2 |

* cited by examiner

*Primary Examiner*—Paul N. Dickson
*Assistant Examiner*—George D. Spisich
(74) *Attorney, Agent, or Firm*—Foley & Lardner LLP (57) ABSTRACT

A tension cushion air bag includes an outer chamber configured to receive a gas such that the outer chamber has an inflated volume. The outer chamber includes a front panel and a rear panel. The tension cushion air bag also includes an inner chamber formed at least in part by the front panel of the outer chamber and at least in part by a front panel patch mounted to the front panel. The inner chamber includes a non-inflated volume which is formed as a result of the inflated volume of the outer chamber.

22 Claims, 9 Drawing Sheets

TENSION CUSHION AIR BAG MODULE

BACKGROUND

The subject of the disclosure relates generally to the field of vehicle safety devices. More specifically, the disclosure relates to a driver-side air bag including an inflated volume and a non-inflated volume to protect drivers during an accident.

A typical driver side air bag is manufactured by joining two circular panels (i.e., a front panel and a rear panel) of woven material. The two panels define a single chamber that is inflated by an air bag inflator or gas generator. This design may provide adequate protection for a driver that, at the time of deployment of the air bag, is seated in what is referred to as a normal sitting position. However, the conventional design described above does not provide adequate protection for a driver seated in what is referred to as an out-of-position (OOP) sitting position.

For example, an OOP driver may be positioned closer than normal to the steering wheel. Thus, upon collision the air bag will inflate very close to the occupant. The force with which the air bag is being inflated could cause serious injury to the occupant. In the alternative, the OOP occupant may collide with the rim of the steering wheel before the air bag is fully deployed which could also result in serious injury. Accordingly, there is a need for an air bag device that deploys such that an OOP driver is protected from forceful impact with an air bag and is substantially prevented from harmful collision with a steering wheel rim.

SUMMARY

According to one exemplary embodiment, a tension cushion air bag module includes an outer chamber, an inner chamber, and a front panel patch covering the inner chamber, wherein when the air bag is inflated, gas is only injected into the outer chamber such that the air bag expands in a radial direction, and the front panel patch is pulled taut across the inner chamber.

According to another exemplary embodiment, the tension cushion air bag module further comprises a diffuser positioned at the mouth of the air bag and attached to an inflator, wherein the diffuser is configured to vent the gas emitted by the inflator in a radial direction to inflate the outer chamber.

According to yet another exemplary embodiment, the amount of material used to form the front panel patch may be less than an area which the front panel patch is intended to cover. The front panel patch may be mounted to a front panel of the outer chamber. In one embodiment, the front panel patch may be made from a thin, uncoated fabric.

In another exemplary embodiment, a tension cushion air bag is provided. The tension cushion air bag includes an outer chamber configured to receive a gas such that the outer chamber has an inflated volume. The outer chamber includes a front panel and a rear panel. The tension cushion air bag also includes an inner chamber formed at least in part by the front panel of the outer chamber and at least in part by a front panel patch mounted to the front panel. The inner chamber includes a non-inflated volume which is formed as a result of the inflated volume of the outer chamber.

In another exemplary embodiment, a method for deploying an air bag is provided. A vehicular impact is detected, and a gas is provided to an outer chamber of the air bag such that the outer chamber has an inflated volume and an inner chamber has a non-inflated volume. The inner chamber is surrounded at least in part by a front panel patch mounted to the outer chamber.

In another exemplary embodiment, a tension cushion air bag system is provided. The tension cushion air bag system includes an air bag and an inflator. The air bag includes an outer chamber configured to receive a gas such that the outer chamber has an inflated volume. The outer chamber includes a front panel and a rear panel. The air bag also includes an inner chamber formed at least in part by the front panel of the outer chamber and at least in part by a front panel patch mounted to the front panel. The inner chamber has a non-inflated volume which is formed as a result of the inflated volume of the outer chamber. The inflator is configured to provide the gas to the outer chamber.

It is to be understood that both the foregoing general description and the following detailed description are exemplary and explanatory only, and are not meant to be restrictive of the invention as claimed.

BRIEF DESCRIPTION OF THE DRAWINGS

These and other features, aspects and advantages of the exemplary embodiments will become apparent from the following description, appended claims, and the accompanying drawings, which are briefly described below.

DETAILED DESCRIPTION

Exemplary embodiments will be described below with reference to the accompanying drawings. It should be understood that the following description of the drawings is intended to describe exemplary embodiments and is not intended to limit the invention as claimed.

Figure 1:
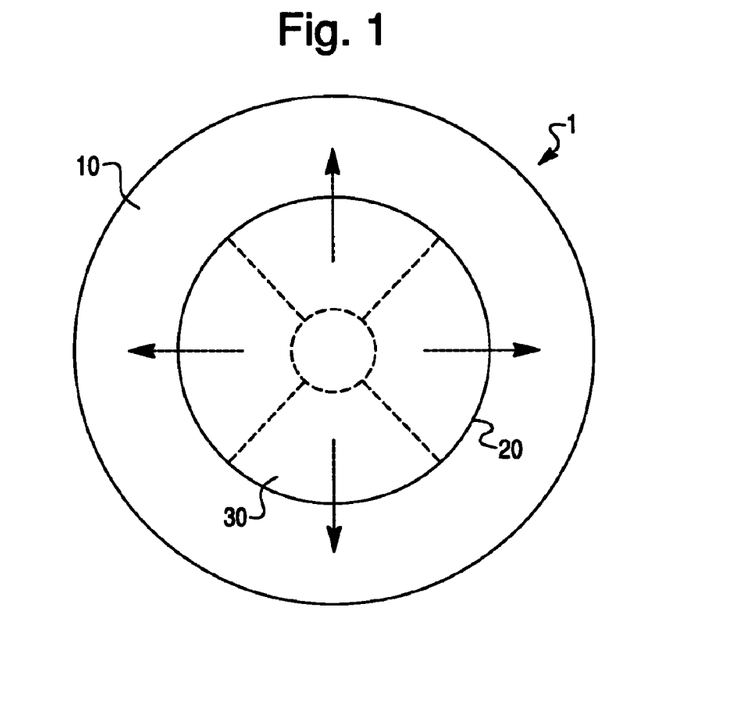
FIG. 1 is a front view of a deployed tension cushion air bag in accordance with an exemplary embodiment.

FIG. 1 is a front view of a deployed tension cushion air bag 1 in accordance with an exemplary embodiment. During a collision event, the tension cushion air bag 1 is deployed on the driver's side of a vehicle to prevent the driver from colliding with the steering wheel (not shown). The tension cushion air bag 1 can include a doughnut shaped cushion having an outer chamber 10 and an inner chamber 20. The inner chamber 20 can be positioned in a center of the tension cushion air bag 1, and can be substantially surrounded by the outer chamber 10. In the deployed state, a surface area of the outer chamber 10 can be greater than a surface area of the steering wheel such that the driver is protected from impact with the steering wheel. A front panel patch (or central membrane) 30 covers the inner chamber 20. The front panel patch 30 is described in more detail with reference to FIGS. 6-8.

Figure 2A:
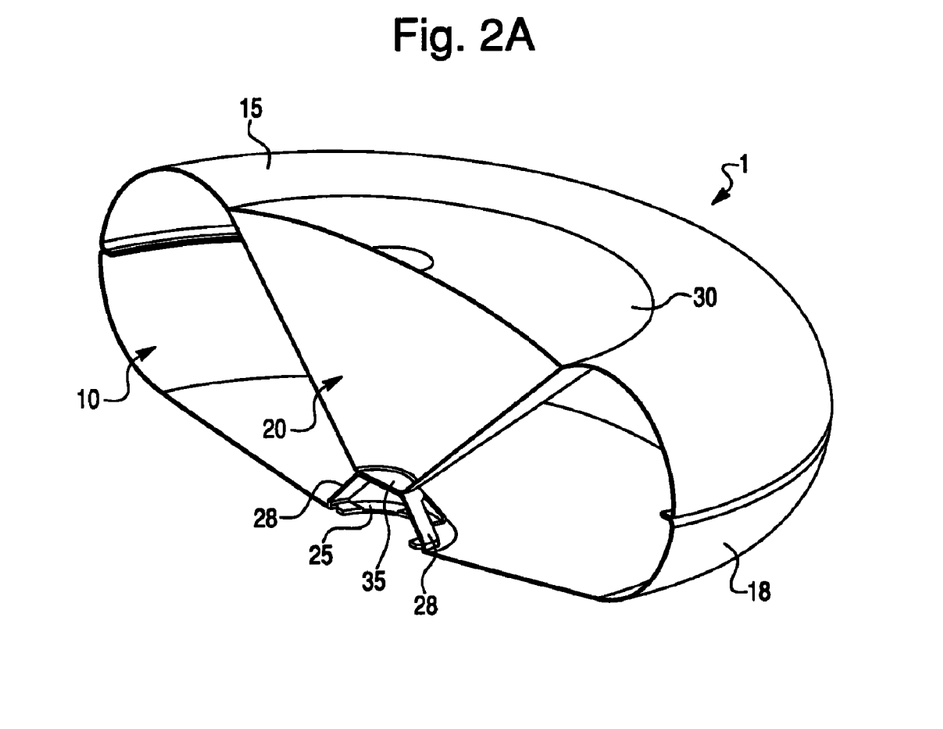
FIG. 2A is a cross-sectional perspective view of the tension cushion air bag of FIG. 1 in accordance with an exemplary embodiment.

FIG. 2A is a cross-sectional perspective view of the tension cushion air bag 1 in accordance with an exemplary embodiment. As illustrated in FIG. 2, the outer chamber 10 includes a front panel 15 and a rear panel 18. The inner chamber 20 can be formed at least in part by the front panel 15 and the front panel patch 30. Alternatively, the inner chamber 20 may be formed by material which is mounted to the front panel 15 and the front panel patch 30. The inner chamber 20 also includes a base 35. A mounting flange 25 can be used to secure the base 35 of the inner chamber 20 in proximity to the rear panel 18 of the outer chamber 10. The mounting flange 25 can also be used to convey a gas from an inflator (not shown) into the outer chamber 10 such that the outer chamber 10 includes an inflated volume. In an exemplary embodiment, the outer chamber 10 is sealed from the inner chamber 20 such that the gas from the inflator does not enter the inner chamber 20. As illustrated with reference to FIG. 2, the inner chamber 20 is substantially shaped like a frustum with smooth sides. As described in more detail with reference to FIGS. 2D and 9A-9E, other shapes and combinations of separate panels may be used for the inner chamber 20.

Figure 2B:
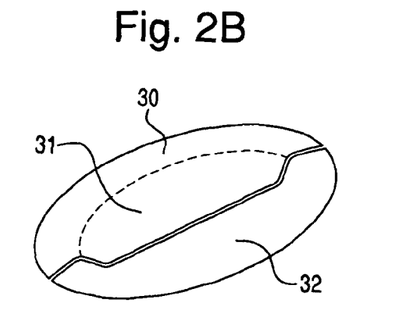
FIGS. 2B-2C are perspective views of alternative front panel patches according to alternative embodiments.
Figure 2C:
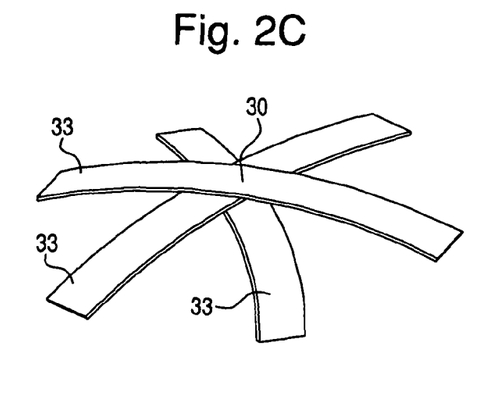
Figure 2D:
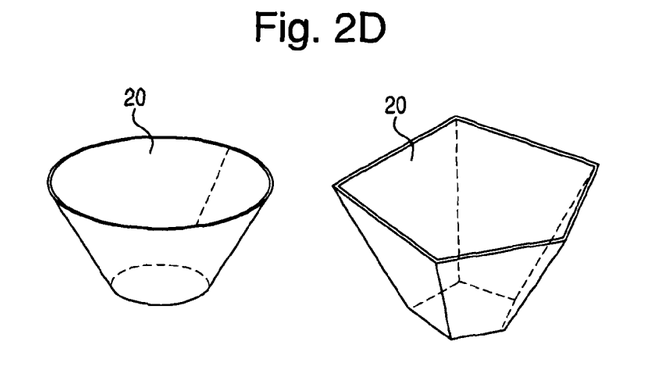
FIG. 2D is a cross sectional view of frustrum shaped inner chambers according to an exemplary embodiment.

For example as shown in FIG. 2D the inner chamber 20 can be comprised of a single conical shaped piece of fabric or, in the alternative may be formed from multiple pieces or panels (i.e., greater than 1 panel) joined together to form a frustrum-like shape. The panels may be geometrically identical or, in the alternative, one or more of the panels can be a different size and/or shape from the remaining panels. It should be understood, that multiple shapes (hexagonal, octagonal, etc.) and sizes of frustrum-like center volumes may be formed using various combinations of panel number, shape and size.

FIGS. 2B and 2C show alternative embodiments of a front panel patch 30. As shown in FIG. 2B, the front panel patch 30 is comprised of overlapping material 31, 32. A top piece 31 is folded over a bottom piece 32. The overlapping structure allows the front panel patch 30 to be stored around a cover device 305 (See FIG. 7). In the alternative, the front panel patch 30 may be formed from several individual pieces 33 as shown in FIG. 2C. When stored, the pieces 33 fit around a cover device 305. Both embodiments shown in FIGS. 2B and 2C allow the airbag to deployed without disturbing the positioning of the cover device 305. Accordingly, the chance that a cover device will come into contact with an occupant during deployment is eliminated.

In an exemplary embodiment, a plurality of different methods can be used to secure the base 35 of the inner chamber 20 in proximity to the rear panel 18.

Figure 3A:
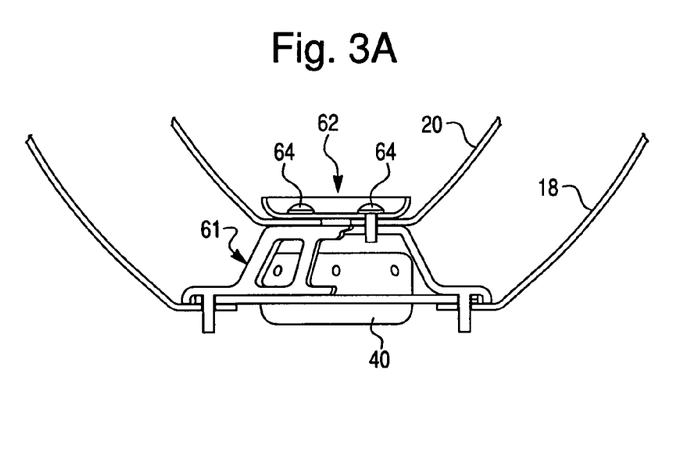
FIG. 3A is a side view of a base mounting assembly for a base of an inner chamber in accordance with a second exemplary embodiment.

FIG. 3A is a side view of a base mounting assembly for a base 60 of an inner chamber in accordance with a second exemplary embodiment. The base mounting assembly includes a mounting element 62 and fasteners 64 which can be used to secure the mounting element 62 to the diffuser 61. The fasteners 64 can be bolts, screws, rivets, or any other type of fastening mechanism known to those of skill in the art. In an exemplary embodiment three fasteners 64 can be used. Alternatively, any other number of fasteners 64 can be used. In an alternative embodiment, the mounting element 62 may snap or latch onto the diffuser 61 such that the fasteners 64 are not used. In another exemplary embodiment, the mounting element 62 can be a circular steel disc which is substantially the same size as a top of the diffuser 61. Alternatively, the mounting element 62 may be plastic, aluminum, or any other material and/or any other shape. In one embodiment, the mounting element 62 may be sewn into or otherwise mounted to the base 60. The base 60 of the inner chamber can be secured between the diffuser 61 and the mounting element 62 to prevent movement of the base 60 and to ensure that the inner chamber is properly positioned.

Figure 3B:
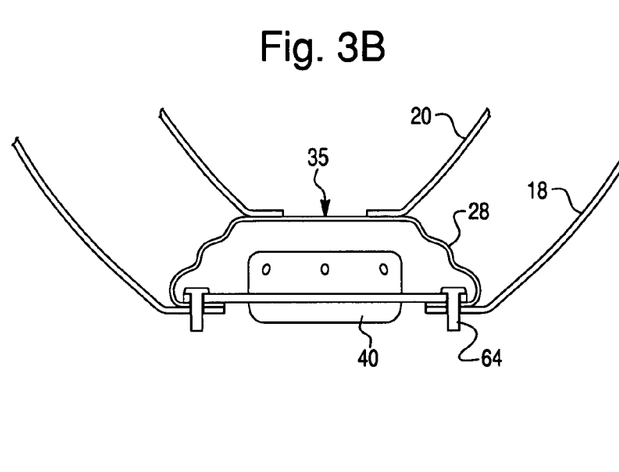
FIGS. 3B-3F are side views of the base of the inner chamber of an airbag according to alternative embodiments.

FIG. 3B shows an inflator assembly with integral fasteners/studs 64. As shown in FIG. 3B, an inflator 40 is mounted to the rear panel 18 via fasteners 64. The fasteners 64 also connect the inflator 40 to legs 28. The legs 28 are connected to the base 35 of the inner chamber 20.

Figure 3C:
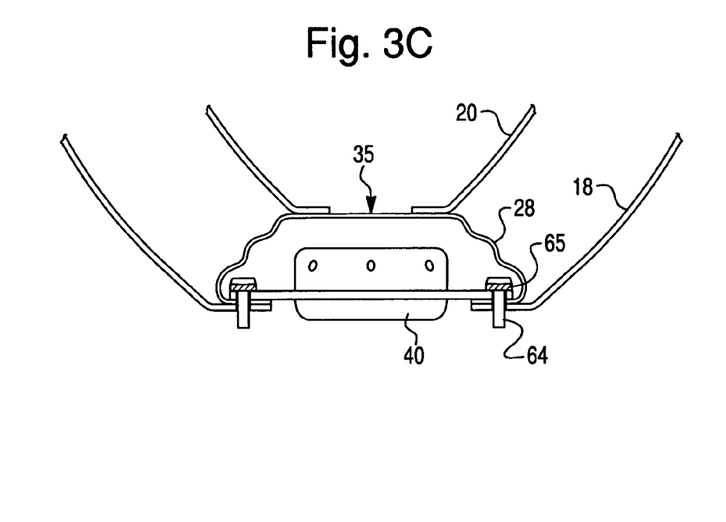

FIG. 3C shows an alternative embodiment where the inflator 40 is mounted to the rear panel 18 of the airbag and the legs 28 with fasteners 64 inserted into retaining rings 65.

Figure 3D:
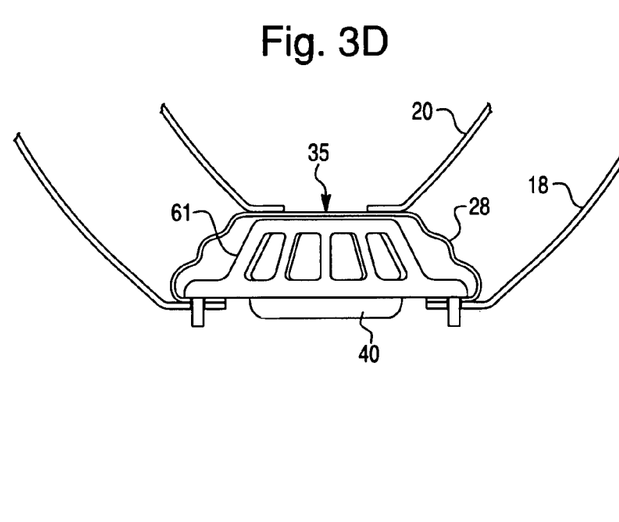

FIG. 3D shows an alternative embodiment where the inflator 40 is encased in a diffuser 61. The diffuser 61 can be made of any suitable material including metal or plastic. The diffuser 61 prevents the fabric of the airbag from being damaged by the hot gas expelled from the inflator 40 when the airbag is activated.

Figure 3E:
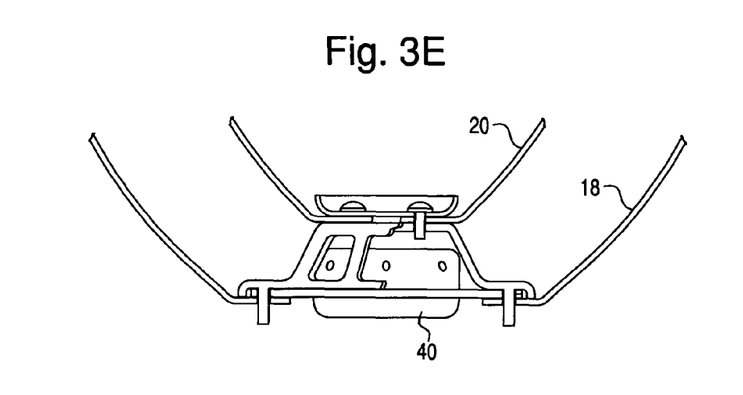
Figure 3F:
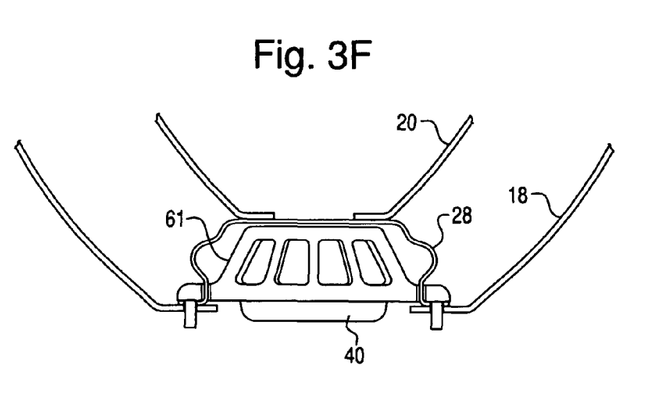

FIG. 3E shows an alternative embodiment having a diffuser 61. In this embodiment, the diffuser 61 is attached to the inner chamber 20 via a plate (or puck) 66 having fasteners attached to the diffuser 61. The plate can be made from any suitable material including but not limited to metal or plastic. Also in this embodiment, instead of legs 28 the frame of diffuser 61 is used to connect the base 35 of the inner chamber 35 and the rear panel 18. A cutaway view of the diffuser 61 is shown to reveal the inflator 40. FIG. 3F shows an alternative embodiment having a diffuser 616. In this embodiment, legs 28 extend from the base 35 and are looped through slots in the diffuser 61 and retained by the diffuser or inflator mounting provisions.

Figure 4:
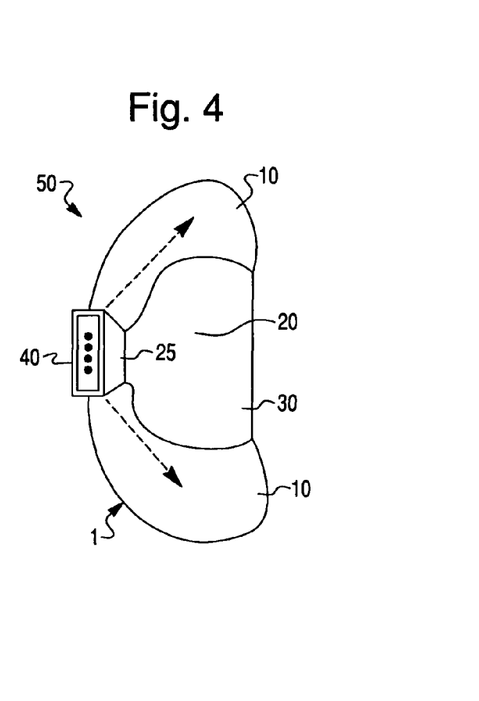
FIG. 4 is a side view of an air bag system in accordance with an exemplary embodiment.

FIG. 4 is a side view of an air bag system 50 in accordance with an exemplary embodiment. The air bag system 50 includes the tension cushion air bag 1, the diffuser 61, and an inflator 40. In an exemplary embodiment, the inflator 40 can be a low output, single stage inflator. A low output inflator can be used because only a portion of the tension cushion air bag 1 (i.e., the outer chamber 10) actually receives gas and has an inflated volume. As a result, a lower volume of gas is needed than in traditional air bag systems. Further, the inner chamber 20 acts as a gas flow director which allows' the tension cushion air bag 1 to rapidly inflate in a radial direction instead of deploying outward toward the driver and potentially causing an injury. This radial expansion can be particularly advantageous if the driver is located in an out-of-position sitting position. In alternative embodiments, the inflator 40 can be any other type of inflator known to those of skill in the art. A control system (not shown) can be used to detect a vehicular impact and to control deployment of the tension cushion air bag 1 by any method known to those of skill in the art.

Figure 5A:
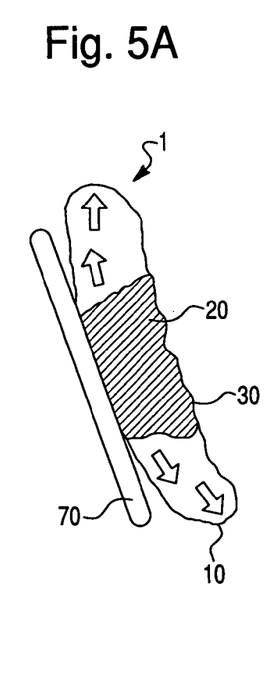
FIG. 5A is a side view illustrating a first stage of inflation of the tension cushion air bag of FIG. 1 in accordance with an exemplary embodiment.
Figure 5B:
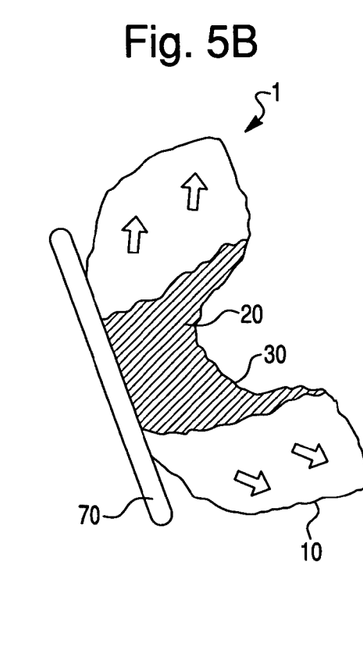
FIG. 5B is a side view illustrating a second stage of inflation of the tension cushion air bag of FIG. 1 in accordance with an exemplary embodiment.
Figure 5C:
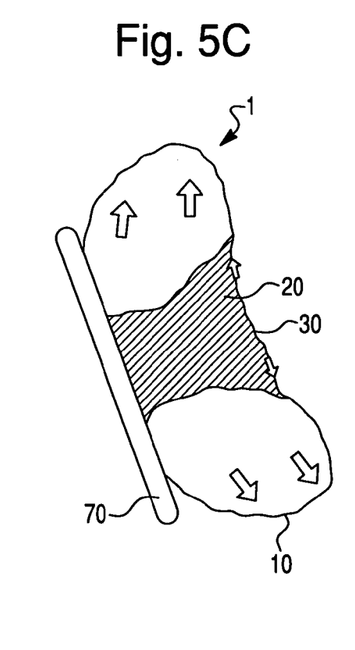
FIG. 5C is a side view illustrating a third stage of inflation of the tension cushion air bag of FIG. 1 in accordance with an exemplary embodiment.
Figure 5D:
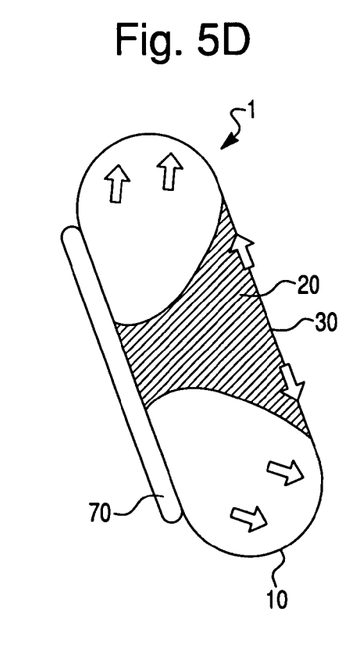
FIG. 5D is a side view illustrating a fourth stage of inflation of the tension cushion air bag of FIG. 1 in accordance with an exemplary embodiment.

FIGS. 5A-5D illustrate various stages of inflation of the tension cushion air bag 1 in accordance with exemplary embodiments. FIG. 5A is a side view illustrating a first stage of inflation of the tension cushion air bag 1. In an exemplary embodiment, one or more sensors can be used to detect a vehicular impact, and the control system can be used to commence deployment of the tension cushion air bag 1. During the first stage of inflation, the tension cushion air bag 1 has been released from a steering wheel 70 and is rapidly inflating in a radial direction. As such, the tension cushion air bag 1 rapidly extends past a circumference of the steering wheel 70 such that the driver is protected from impact with the steering wheel 70. The front panel patch 30 of the inner chamber 20, which protects the driver from impact with the center of the steering wheel 70, remains loose until the outer chamber 10 is fully inflated as shown in FIG. 5D. The driver remains protected from impact with the steering wheel 70 throughout the stages of inflation. Because the outer chamber 10 initially deploys in a radial direction, an out-of-position driver is also protected from undesirable premature impact with the tension cushion air bag 1. The tension cushion airbag can be configured to reach each stage of inflation at different time periods based on various environmental and desired performance factors. In an exemplary embodiment, the tension cushion air bag 1 can reach the first stage of inflation approximately 10 milliseconds (ms) after vehicular impact.

FIG. 5B is a side view illustrating a second stage of inflation of the tension cushion air bag 1. During the second stage, the outer chamber 10 of the tension air bag 1 expands away from the steering wheel 70 and toward the driver. Because of the outward inflation of the outer chamber 10 toward the driver, the front panel patch 30 may develop a temporary slack as illustrated in FIG. 5B. As such, the front panel patch 30 can remain substantially taut during the second stage of inflation and protect the driver from contact with the steering wheel 70. The size of the front panel patch 30 is described in more detail with reference to FIG. 6. In an exemplary embodiment, the tension cushion air bag 1 can reach the second stage of inflation approximately 19 ms after vehicular impact.

FIG. 5C is a side view illustrating a third stage of inflation of the tension cushion air bag 1. During the third stage, the outer chamber 10 is substantially inflated, and the front panel patch 30 has begun to stretch out. In an exemplary embodiment, the tension cushion air bag 1 reaches the third stage of inflation approximately 22 ms after vehicular impact. FIG. 5D is a side view illustrating a fourth stage of inflation of the tension cushion air bag 1. During the fourth stage of inflation, the outer chamber 10 is fully inflated, and the front panel patch 30 can be fully stretched out and taut. In an exemplary embodiment, the tension cushion air bag 1 reaches the fourth stage of inflation approximately 26 ms after vehicular impact. In alternative embodiments, full deployment of the tension cushion air bag 1 may take approximately 27.5 ms.

Figure 6:
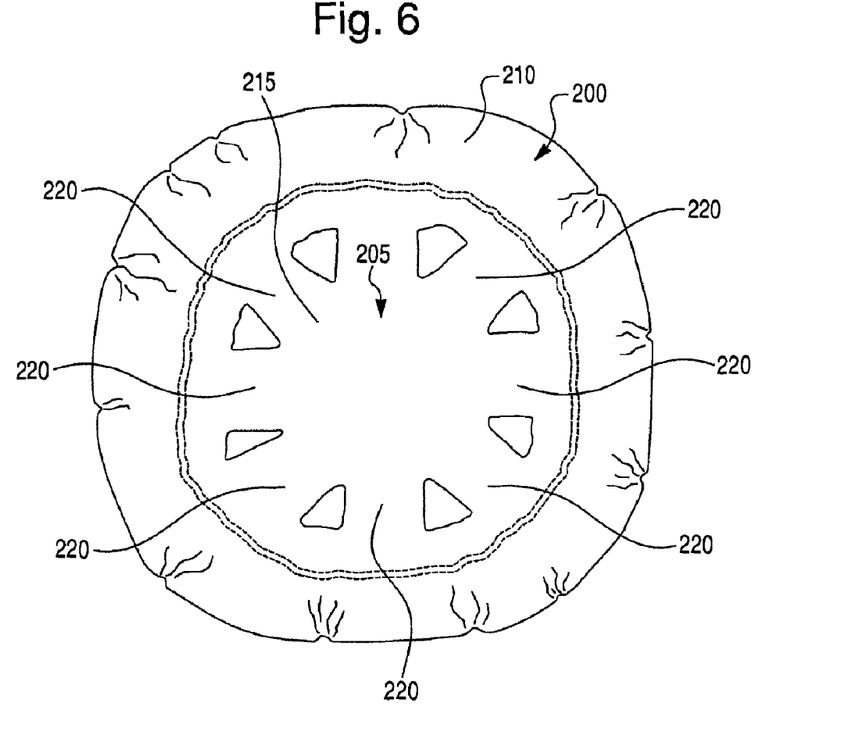
FIG. 6 is a front view of a tension cushion air bag with a front panel patch in accordance with an exemplary embodiment.

FIG. 6 is a front view of a tension cushion air bag 200 with a front panel patch 205 in accordance with an exemplary embodiment. The front panel patch 205 is mounted to a front panel 210 of the tension cushion air bag 200. In an exemplary embodiment, the front panel patch 205 includes a body 215 from which a plurality of mounting members 220 extend. The mounting members 220 can be used to mount the front panel patch 205 to the front panel 210 and/or an inner chamber panel. The mounting members 220 can also be used to add elasticity to the front panel patch 205. In an exemplary embodiment, a diameter of the front panel patch 205 (in a non-stretched state) can be smaller than the geometric surface which the front panel patch 205 is intended to cover.

As an example, if the geometric surface that is to be covered has a diameter of approximately 10 inches, the front panel patch 205 may have a diameter of approximately 8 inches. The front panel patch 205 can be constructed from a thin, uncoated fabric or other material having an amount of elasticity such that the front panel patch 205 is taut and able to absorb driver impact with a diameter of 8 inches. In an exemplary embodiment, the size of the front panel patch 205 can be a factor of approximately 0.797 less than the size of the geometric surface which the front panel patch 205 is intended to cover. In another exemplary embodiment, the size of the front panel patch 205 can be a factor of anywhere from approximately 0.6 to approximately 0.99 less than the size of the geometric surface which the front panel patch 205 is intended to cover.

Figure 7:
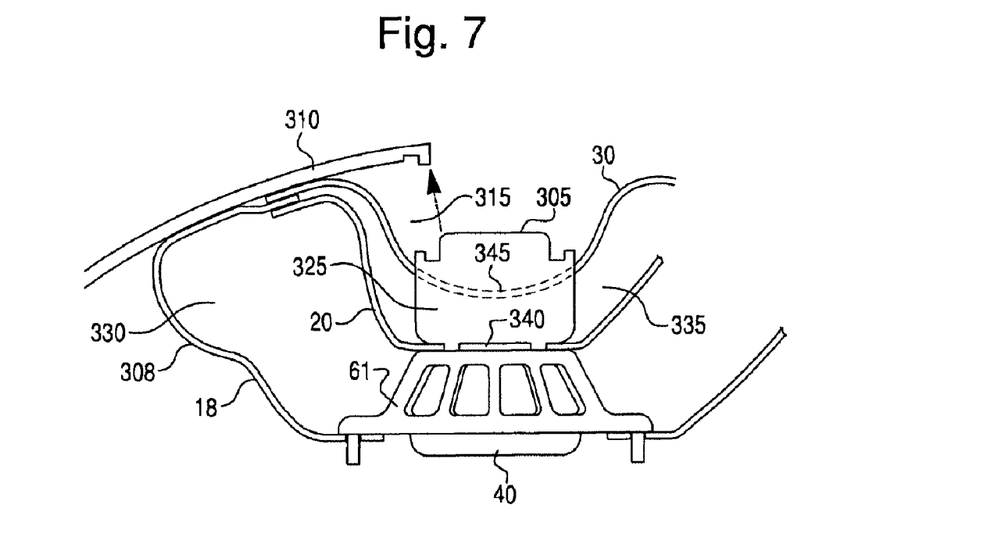
FIG. 7 is a side view of a tension cushion air bag system having a cover device in accordance with an exemplary embodiment.

FIG. 7 is a side view of a tension cushion air bag system 300 having a cover device 305 in accordance with an exemplary embodiment. The cover device 305 is exposed on an A surface of the vehicle. For example, the cover device 305 may be an emblem on a steering wheel or passenger dashboard. This embodiment illustrates deployment where the front panel patch 30 is constructed as shown in one of FIG. 2B or 2C. Initially, the front panel patch 30 is stored around the cover device 305. Upon deployment, the front panel patch 30 deploys around the cover device 305 while the cover device 305 remains in its original position. FIG. 7 also shows a steering wheel cover 310 configured to attach to the cover device 305 being propelled away from the cover device 305 upon deployment of the airbag.

The tension cushion air bag system 300 includes a tension cushion air bag 308, a diffuser 61, a mounting element 325 mounted to the diffuser 61, and the cover device 305 mounted to the mounting element 325. In an alternative embodiment, the cover device 305 and the mounting element 325 may be a single unit. The tension cushion air bag 308 includes an outer chamber 330 and an inner chamber 335. The inner chamber 335 of the tension cushion air bag 308 includes a base 340 and a front panel patch 345. In addition to the front panel patch 345, the inner chamber 335 may also include an inner chamber panel mounted underneath the front panel patch 345. The mounting element 325 can be used to secure the base 340 of the inner chamber 335 to an upper surface of the diffuser 61. As described in more detail below, the front panel patch 345 can be mounted between the cover device 305 and the mounting element 325. Alternatively, the front panel patch 345 may be mounted between the mounting element 325 and the diffuser 61.

The cover device 305 can be a special effect emblem, a decal, a horn button, a liquid crystal display (LCD) screen, a touch screen display, a warning or indicator light, a cruise control button, a radio control, and/or any other device which is desirable to have in a center of a steering wheel. In traditional air bag systems, such cover devices are impractical because their weight can potentially restrict and/or slow the opening of the steering wheel cover in response to vehicular impact, thereby inhibiting air bag deployment and increasing the likelihood of injury to the driver. The cover device 305 of FIG. 7 does not suffer from such a limitation because the cover device 305 remains stationary during deployment of the tension cushion air bag 308. In an exemplary embodiment, the tension cushion air bag 308 is configured to deploy around the cover device 305.

Figure 8:
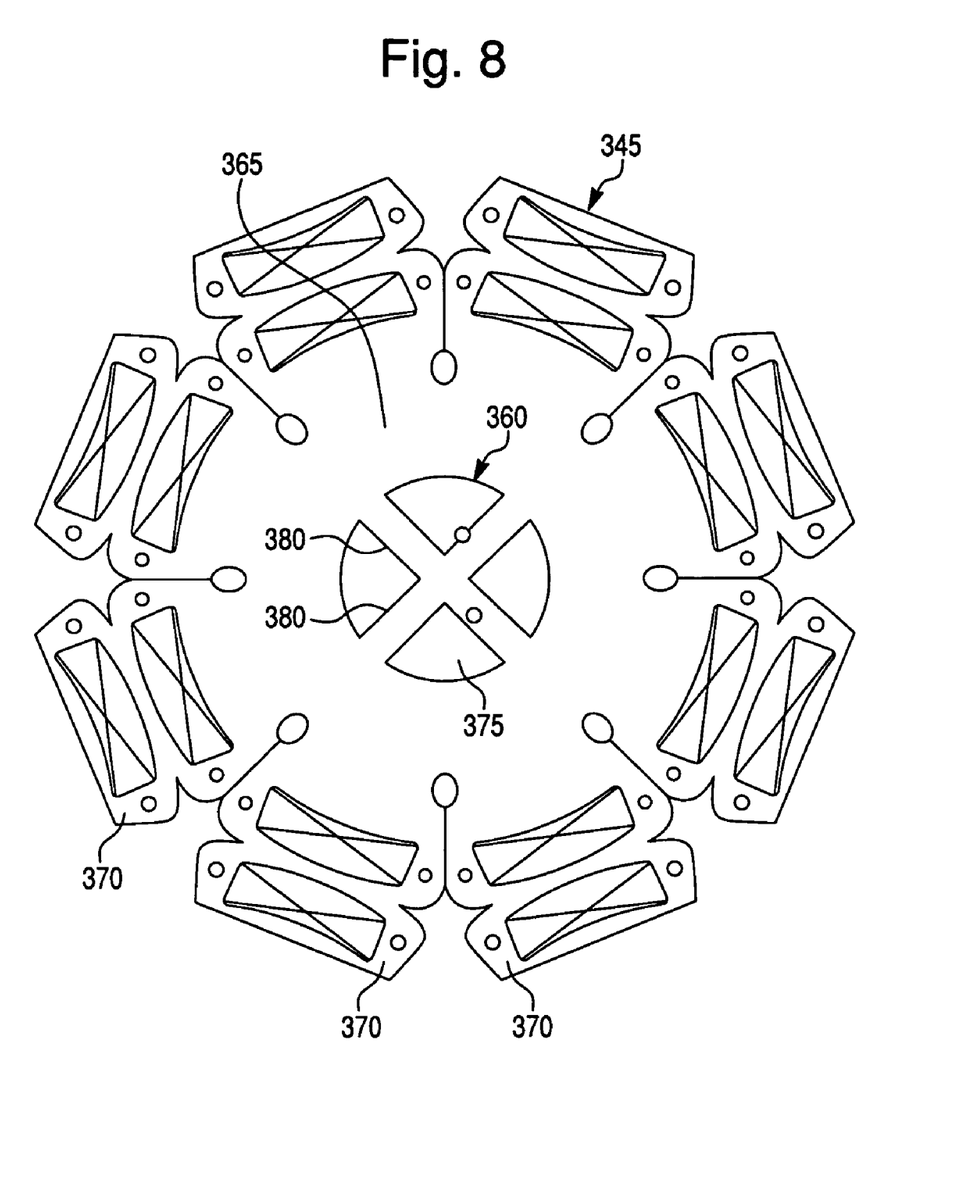
FIG. 8 is a top view of a front panel patch with a tear away portion in accordance with an exemplary embodiment.

Deployment of the tension cushion air bag 308 around the cover device 305 can be provided by incorporating a break away or tear away feature into the front panel patch 345. According to another embodiment a front panel patch 345 having overlapped layers as shown in FIG. 2B or multiple pieces as shown in FIG. 2C may be used. FIG. 8 is a top view of the front panel patch 345 with a tear away portion 360 in accordance with an exemplary embodiment. The front panel patch 345 includes a body 365, a plurality of mounting members 370 used for mounting the front panel patch 345 to the outer chamber 330, and the tear away portion 360 incorporated into the body 365. The tear away portion 360 includes an aperture 375 and cross pieces 380 mounted to the aperture 375. In an exemplary embodiment, the aperture 375 can be substantially the same size as a diameter of the cover device 305. The cross pieces 380 can be used to ensure that a center of the front panel patch 345 remains in place between the mounting element 325 and the cover device 305 during assembly of the tension cushion air bag 308 and normal vehicular operation. Upon deployment of the tension cushion air bag 308, the cross pieces can be configured to tear such that the aperture 375 is able to deploy around the cover device 305.

As illustrated with reference to FIG. 7, the cover device 305 is mounted between sections of a steering wheel cover 310. The sections of the steering wheel cover 310 and the cover device 305 are mounted to each other through mating channels 315 incorporated into the cover device 305. Alternatively, the mating channels 315 may be incorporated into the sections of the steering wheel cover 310. In another alternative embodiment, the mounting element 325 may be composed of a plurality of pieces which are configured to hold the sections of the steering wheel cover 310 in place. In another alternative embodiment, a snap, latch, or any other configuration may be used to keep the sections of the steering wheel cover 310 in place during normal vehicular operation. When a vehicular impact is detected, the outer chamber 330 of the tension cushion air bag 308 can begin to inflate, and the sections of the steering wheel cover 310 can deploy and allow the tension cushion air bag 308 to expand outward from the steering wheel. The cross pieces 380 of the tear away portion 360 of the front panel patch 345 can tear, and the aperture 375 can deploy around the stationary cover device 305. A diameter of the aperture 375 can be sufficiently small (i.e., much smaller than the size of a human head) such that full protection is provided to the driver. In an alternative embodiment, the cross pieces 380 may not be used, and the aperture 375 can be slightly smaller than the diameter of the cover device 305 such that the front panel patch 345 is held in place during normal operation. In such an embodiment, the aperture 375 can expand and deploy around the cover device 305 during deployment of the tension cushion air bag 308. In another alternative embodiment, a piece of fabric or other material may be mounted to the body 365 of the front cover patch 345 and used to cover the aperture 375.

As described above with reference to FIGS. 2 and 4, the tension cushion air bag includes an inflated volume (i.e., the outer chamber) and a non-inflated volume (i.e., the inner chamber). The inflated volume is filled with pressurized gas from an inflator. The non-inflated volume is not filled with gas from the inflator, but rather is formed as a result of the deployment and expansion of the inflated volume of the outer chamber. The non-inflated volume may fill with air as a result of the gas-induced expansion of the outer chamber. It is to be understood that while the "non-inflated" volume does technically inflate, the inflation is due to the configuration of the air bag (i.e., the physical relationship between the inner chamber and the outer chamber), and not due to the direct injection of gas into the inner chamber.

In an exemplary embodiment, it can be beneficial to maximize a ratio of the non-inflated volume relative to the inflated volume. For example, the tension cushion air bag is able to deploy more rapidly if there is less inflated volume which needs to be filled. Also, a cost efficient, low output inflator can be used to inflate the outer chamber if less gas is used. Further, maximizing the non-inflated volume allows the tension cushion air bag to initially expand in a radial direction relative to the steering wheel, because the gas cannot enter that center portion of the cushion. Initial deployment in the radial direction allows rapid coverage of the steering wheel and helps prevent driver injury due to impact with the air bag. In one embodiment, the ratio of the size of the inner chamber relative to the size of the outer chamber can be maximized by maximizing the non-inflated volume of the inner chamber.

FIGS. 9A-9E illustrate two dimensional, non-sewn bases of inner chambers/frustrums in accordance with exemplary embodiments. By altering the size and/or shape of the base of the inner chamber, the size and sturdiness of the inner chamber can be controlled. By utilizing the various orientations that will be described in detail below, the volume of the inner chamber 20 can be increased which in turn reduces the relative volume of the inflated portion. Using the various embodiments described below the inflated volume can be reduced, for example, up to 50%. Preferably, the inner chamber accounts for a 27% reduction in the volume of the airbag. That is, 27% of the total volume of the airbag consists of the inner chamber which is not inflated.

In one embodiment, the collapsing of the inner chamber can be prevented by altering a shape of the perimeter of the base of the inner chamber. The views illustrated with reference to FIGS. 9A-9E are partial views of bases, and are provided for illustrative purposes. In an exemplary embodiment, a base of an inner chamber can be a continuous shape with 360 degree coverage.

Figure 9A:
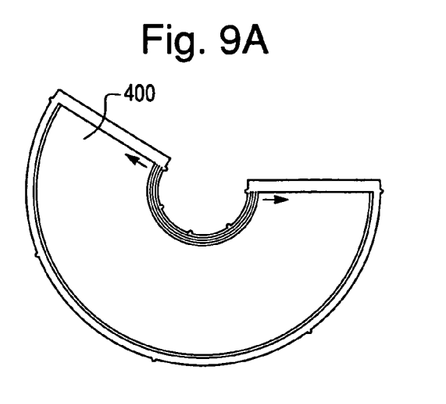
FIG. 9A is a two dimensional flat view of a frustrum in accordance with an exemplary embodiment.
Figure 9B:
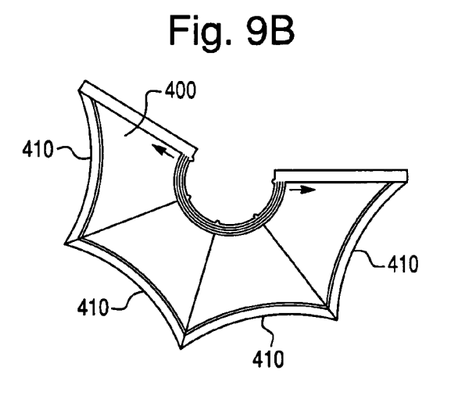
FIG. 9B is a top view of a four point base of an inner chamber in accordance with a second exemplary embodiment.
Figure 9C:
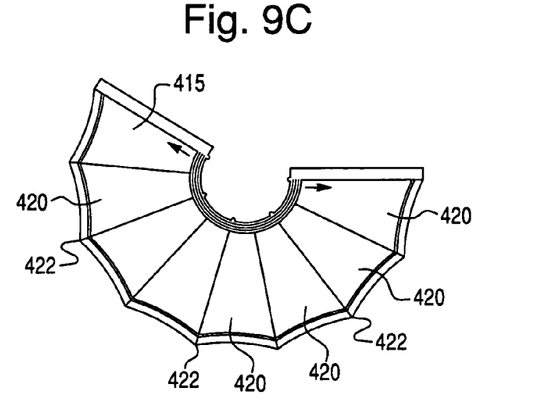
FIG. 9C is a top view of an eight point base of an inner chamber in accordance with a third exemplary embodiment.

FIG. 9A is a top view of a base 400 of an inner chamber in accordance with a first exemplary embodiment. Using the base 400 can result in an inner chamber which is shaped like a frustum with smooth sides. FIGS. 9B-9E illustrate various bases in which the perimeter of the base 400 is altered to provide additional support to the inner chamber. FIG. 9B is a top view of a four point base 405 of an inner chamber in accordance with a second exemplary embodiment. The four point base 405 can be formed by dividing the base 400 into four equal angular segments to obtain four perimeter arcs 410 of equal length. The four perimeter arcs 410 can be mirrored or inverted toward the interior of the base 400 to obtain the four point base 405. FIG. 9C is a top view of an eight point base 415 of an inner chamber in accordance with a third exemplary embodiment. The eight point base 415 can be formed by dividing the base 400 into eight equal angular segments to obtain eight perimeter arcs 420 of equal length. The eight perimeter arcs 420 can be mirrored or inverted toward the interior of the base 400 to obtain the eight point base 415.

Figure 9D:
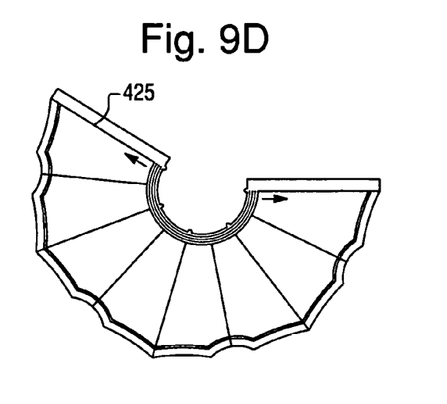
FIG. 9D is a top view of a double inverted eight point base of an inner chamber in accordance with a fourth exemplary embodiment.

FIG. 9D is a top view of a double inverted eight point base 425 of an inner chamber in accordance with a fourth exemplary embodiment. The double inverted eight point base 425 can be obtained by using a mathematical function to invert each of the points 422 of the eight point base 415 of FIG. 9C.

Figure 9E:
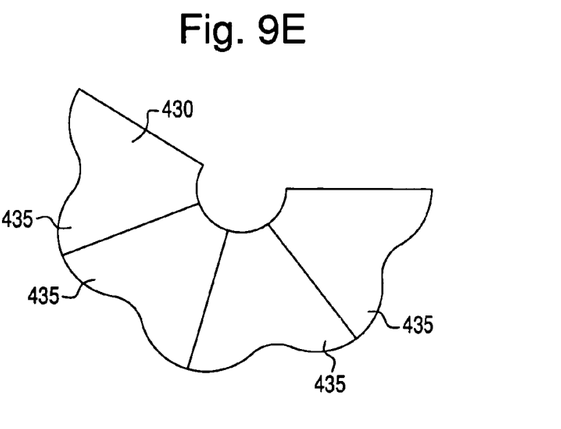
FIG. 9E is a top view of a cosine base of an inner chamber in accordance with a fifth exemplary embodiment.

FIG. 9E is a top view of a trigonometric base 430 of an inner chamber in accordance with a fifth exemplary embodiment. The trigonometric base 430 can be formed by dividing the base 400 of FIG. 9A into four equal angular segments to obtain four perimeter arcs 435 of equal length. The mathematical function −cos(x) can be applied to each of the four perimeter arcs 435 to obtain the trigonometric base 430. In alternative embodiments, other methods may be used to maximize the non-inflated volume and/or increase the stability of the base of the inner chamber. For example, the base of the inner chamber may be substantially square, elliptical, triangular, octagonal, etc.

Figure 10:
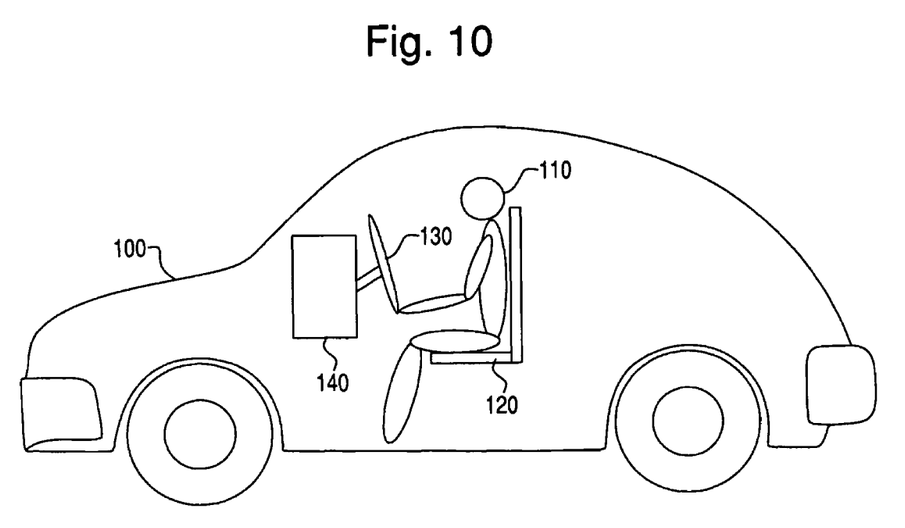
FIG. 10 is a side view of a vehicle in which a tension cushion airbag may be used in accordance with an exemplary embodiment.

FIG. 10 is a side view of a vehicle 100 in which a tension cushion airbag may be used in accordance with an exemplary embodiment. The vehicle 100 includes a seat 120, a dashboard 140, and a steering wheel 130 mounted to the dashboard 140. A driver 110 is positioned on the seat 120, and is using the steering wheel 130 to steer the vehicle 100. In an exemplary embodiment, a tension cushion air bag as described with reference to FIGS. 1-9 can be mounted in a center of the steering wheel 130 and used to protect the driver 110 from collision with the steering wheel 130 during an accident.

According to the several embodiments discussed above, the tension cushion air bag has several advantages over traditional air bag systems. The uniform and consistent radial deployment of the outer chamber assists in preventing premature occupant contact with the steering wheel. In addition, the lack of gas being vented into the inner chamber of the air bag prevents an occupant that may be sitting close to the air bag from sustaining serious injury due to impact with the inflating air bag. Further, because gas is not vented into the inner chamber of the air bag, the overall inflated volume of the tension cushion air bag is reduced such that a smaller, lighter inflator can be used to inflate the tension cushion air bag. The arrangement of the tension cushion air bag further allows a cover device to be mounted to the steering wheel without interfering with air bag deployment. In addition, the airbag design can be applied to other airbag types including mid mount passenger side airbags, inflatable knee bolsters and the like. As discussed above, additional advantages are also provided by the tension cushion air bag.

The foregoing description has been presented for purposes of illustration and description. It is not intended to be exhaustive or to limit the invention to the precise form disclosed, and modifications and variations are possible in light of the above teaching or may be acquired from practice of the invention. The embodiments were chosen and described in order to explain the principles of the invention and as a practical application to enable one skilled in the art to utilize the invention in various embodiments and with various modification suited to the particular use contemplated. It is intended that the scope of the invention be defined by the claims appended hereto and their equivalents.

What is claimed is:

1. A tension cushion air bag comprising:
   an outer chamber configured to receive a gas such that the outer chamber has an inflated volume, wherein the outer chamber is formed by a front panel, a rear panel and an inner side panel; and
   an inner chamber formed by the front panel, the inner side panel and a front panel patch mounted to the front panel, wherein the inner chamber comprises a non-inflated volume which is formed as a result of the inflated volume of the outer chamber, and wherein when the airbag is inflated the front panel patch is pulled taut across the inner chamber in order to absorb the energy of an occupant,
   wherein the inner side panel forms a frustrum shape for the inner chamber; and
   wherein the front panel patch comprises an elastic material, and further wherein a diameter of the front panel patch in a non-stretched state is less than a length which the front panel patch covers when the tension cushion air bag is deployed.

2. The tension cushion air bag of claim 1, further comprising a diffuser configured to restrain a base of the inner chamber.

3. The tension cushion air bag of claim 2, wherein the diffuser is further configured to convey the gas into the outer chamber such that the outer chamber deploys in a radial direction relative to a steering wheel to which the tension cushion air bag is mounted.

4. The tension cushion air bag of claim 1, wherein the front panel patch comprises a body and a plurality of mounting members, wherein the plurality of mounting members are configured to mount to the front panel.

5. The tension cushion air bag of claim 1, wherein the diameter of the front panel patch in the non-stretched state is approximately 0.8 times the length which the front panel patch covers when the tension cushion air bag is deployed.

6. The tension cushion air bag of claim 1, wherein the diameter of the front panel patch in the non-stretched state is between approximately 0.6 and approximately 0.99 times the length which the front panel patch covers when the tension cushion air bag is deployed.

7. The tension cushion air bag of claim 1, wherein the inner chamber makes up at most 50% of the total volume of the air bag.

8. A tension cushion air bag system for protecting an occupant of a vehicle comprising:
   an air bag comprising:
      an outer chamber configured to receive a gas such that the outer chamber has an inflated volume, wherein the outer chamber is formed by a front panel and a rear panel and a base panel;
      an inner chamber formed by the base panel and a front panel patch mounted to the front panel, wherein the inner chamber comprises a non-inflated frustrum shaped volume which is formed as a result of the inflated volume of the outer chamber; and
   an inflator configured to provide the gas to the outer chamber, wherein the front panel patch comprises an elastic material, and further wherein
   wherein the base panel forms the outside side wall of the inner chamber and the inside side wall of the outer chamber so that inner chamber is bounded on the sides by the base panel and on a side facing the occupant by the front panel patch.

9. The tension cushion air bag system of claim 8, further comprising a diffuser configured to restrain the base panel, wherein a cover device is mounted to the diffuser.

10. The tension cushion air bag system of claim 9, further comprising a mounting element configured to mount to the diffuser, and further wherein the base panel is mounted between the diffuser and the mounting element.

11. The tension cushion air bag system of claim 8, further comprising a cover device mounted to a steering wheel, wherein the air bag is configured to deploy around the cover device.

12. The tension cushion air bag system of claim 11, wherein the front panel patch comprises an aperture.

13. The tension cushion air bag system of claim 12, wherein the aperture of the front panel patch is mounted between the cover device and a diffuser, and further wherein the aperture is configured to deploy around the cover device when the air bag deploys.

14. The tension cushion air bag system of claim 11, wherein the cover device is mounted between a first steering wheel cover section and a second steering wheel cover section, and further wherein the first steering wheel cover section and the second steering wheel cover section are configured to release from the cover device upon deployment of the air bag.

15. The tension cushion air bag system of claim 11, wherein the cover device comprises at least one of a special effect emblem, a decal, a horn button, a liquid crystal display (LCD) screen, a touch screen display, a light, a cruise control button a radio control device or a consumer device.

16. The tension cushion air bag system of claim 8, wherein the inner chamber comprises a base, and further wherein the base comprises at least one of a four point base, an eight point base, a double inverted eight point base, and a cosine base.

17. The tension cushion air bag system of claim 8, wherein the inflator comprises a low output, single stage inflator.

18. A tension air bag module for protecting the occupant of a vehicle, comprising:
an airbag including
an inflatable outer ring;
an inner chamber surrounded by the outer ring; and a central membrane covering the inner chamber, wherein when the air bag is inflated, gas is only injected into the outer ring such that the air bag expands in a radial direction, and the central membrane is pulled taut across the inner chamber, wherein the central membrane comprises an elastic material, and
wherein a base panel forms the outside side wall of the inner chamber and the inside side wall of the outer ring so that inner chamber is bounded on the sides by the base panel and on a side facing the occupant by the central membrane;
wherein the inner chamber is frustrum shaped when the air bag is inflated;
further wherein a diameter of the central membrane in a non-stretched state is less than a length which the central membrane covers when the tension air bag module is deployed.

19. A tension air bag module as claimed in claim 18, further comprising a diffuser positioned at the mouth of the air bag and attached to an inflator, wherein the diffuser is configured to vent the gas ejected by the inflator in a radial direction to inflate the outer ring.

20. A tension air bag module as claimed in claim 18, wherein the amount of material used to form the central membrane is slightly less than what is needed to cover the area inside the rim of a steering wheel.

21. A tension air bag module as claimed in claim 18, wherein the central membrane is made from a thin, uncoated fabric.

22. The air bag module of claim 18, wherein the base panel is fan shaped and is connected along two corresponding radially extending edges to form the frustrum shaped side wall of the non-inflatable inner chamber.

* * * * *